March 7, 1961    E. G. MONTHEI ET AL    2,973,817
DRAWBAR ATTACHMENT FOR PLOWS
Filed July 27, 1959
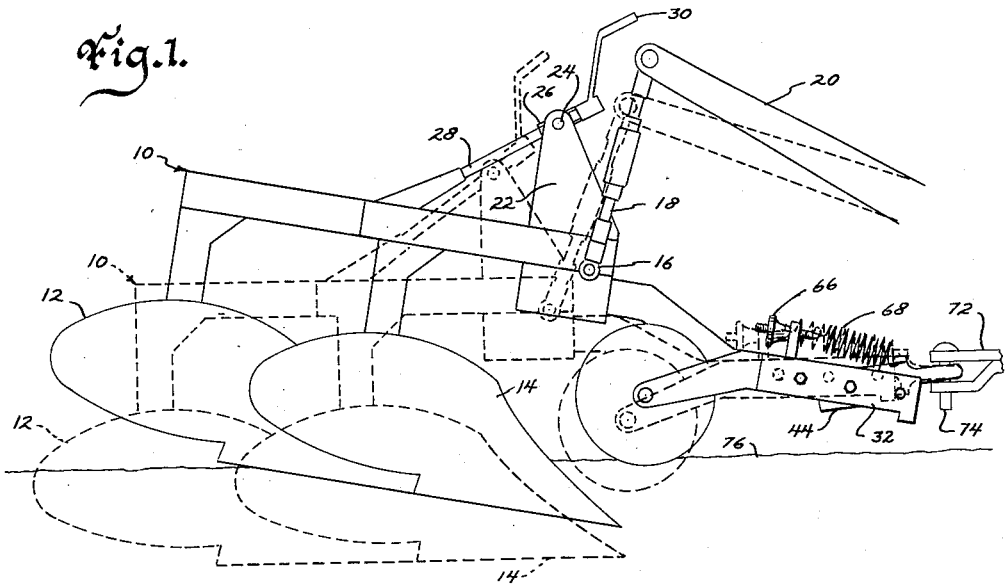
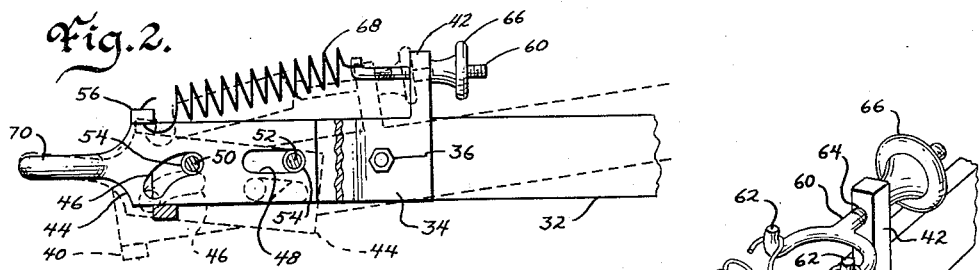
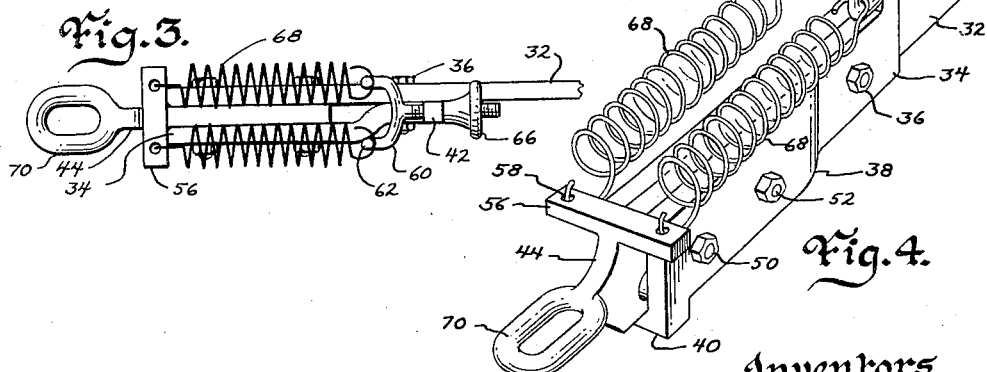
Inventors
Earl D. Blair &
Edward G. Monthei
by Donald H. Zarley
Attorney
Witness
Edward P. Seeley

United States Patent Office 2,973,817
Patented Mar. 7, 1961

2,973,817
DRAWBAR ATTACHMENT FOR PLOWS
Edward G. Monthei and Earl D. Blair, both of Jefferson, Iowa
Filed July 27, 1959, Ser. No. 829,831
6 Claims. (Cl. 172—239)

Our device relates to drawbar attachments for plows and more particularly to a drawbar attachment that will automatically permit a plow unit to more quickly attain its proper plowing depth.

Many times, particularly when the ground is packed or otherwise hard, a plow unit will not attain its proper plowing depth until sometime after the tractor unit has pulled the plow some distance from the end of the field. This is because the hard ground resists the entrance of the plow and the result of this problem is that many fields are plowed at a very shallow depth at the ends thereof.

Therefore, the principal object of our invention is to provide a drawbar attachment that will permit a plow unit to attain quickly its proper cutting depth as the plow-bearing tractor starts its initial pull.

A further object of our invention is to provide a drawbar attachment for plows that will automatically level off the plow after the plow has reached the proper plowing depth.

A still further object of our invention is to provide a drawbar attachment for plows that will permit a plow unit to attain quickly its proper cutting depth as the plow-bearing tractor starts its initial pull, and which can have its operating parts selectively adjusted.

A still further object of our invention is to provide a drawbar attachment for plows that is economical of manufacture, durable in use and refined in appearance.

These and other objects will be apparent to those skilled in the art.

Our invention consists in the construction, arrangement, and combination, of the various parts of the device, whereby the objects contemplated are attained as hereinafer more fully set forth, specifically pointed out in our claims, and illustrated in the accompanying drawings, in which:

Fig. 1 is a side elevational view of our device attached to a plow unit. The solid lines in this figure depict the plow unit in a position just as it is entering the ground and the dotted lines show the plow in its normal, level, plowing position;

Fig. 2 is a more detailed sectional view of our device. The solid lines show the normal plowing position and the dotted lines show the automatic suction position;

Fig. 3 is a top view of our device; and

Fig. 4 is a frontal perspective view of our device.

The numeral 10 generally designates the frame of a conventional plow unit with plow members 12 and 14 secured thereto. A conventional cross bar 16 is secured to frame 10 in any convenient fashion and one end of connecting arms 18 is rotatably secured thereto. The other ends of connecting arms 18 are pivotally secured to the rearward ends of arms 20 which are pivotally mounted on a tractor (not shown) and which are hydraulically powered to pivot upwardly and downwardly. Beaming plates 22 are pivotally secured to frame 10 in any convenient fashion and horizontal pin 24 extends therebetween. A collar 26 is rotatably mounted on pin 24 and a beaming screw 28 extends through collar 26 and is pivotally connected (not shown) at its rearward end to frame 10. A crank 30 is rigidly secured to the upper end of beam screw 28. As the plow unit is supported by arms 20 and connecting arms 18, the angular position of frame 10 and plows 12 and 14 can be changed by rotating beam screw 28 with crank 30 which causes the frame to rotate about cross bar 16. However, this operation cannot be utilized by the tractor operator during the plowing operation. The structure described heretofore does not constitute a part of my invention of itself.

A tongue 32 rigidly extends forwardly from the beam plates 22 on frame 10. A bracket 34 can be secured to the forward end of tongue 32 by nut and bolt assembly 36. Bracket 34 is indented at 38 to extend in parallel but spaced apart relation with tongue 32. A stop bar 40 can be welded to the forward underneath ends of tongue 32 and bracket 34. A vertical post 42 can extend upwardly from the rearward end of bracket 34 as shown in Fig. 4.

A bar 44 with arcuate slot 46 and straight elongated slot 48 is adapted to be mounted in the space between tongue 32 and bracket 34. Horizontal bolts 50 and 52 extend between tongue 32 and bracket 34 and are received in slots 46 and 48 respectively. The distance between bolts 50 and 52, and the respective forward and rearward ends of slots 46 and 48 should be substantially the same. As shown in Fig. 2, the rearward end of slot 46 is in alignment with slot 48 but the forward end of slot 46 is at a point lower than the rearward end. Bushings 54 can be placed on bolts 50 and 52 within slots 46 and 48 to reduce the friction between the bolts and the respective slots.

As shown in Figs. 4 and 3, a crossbar 56 extends laterally from the upper forward end of bar 44 and vertical holes 58 appear in the ends of the crossbar. A yoke 60 with forwardly extending bent fingers 62 is slidably mounted in a horizontal hole 64 in the upper end of post 42. The rearward end of yoke 60 threadably receives disc 66. Springs 68, which are normally under tension, extend from the bent fingers 62 on yoke 60 to the holes 58 in crossbar 56.

A horizontal ring 70 is formed on the forward end of bar 44 and is adapted to be secured to the drawbar of a tractor in any convenient manner such as by clevis 72 and pin 74. The exact means of connection between ring 70 and the tractor drawbar is not critical as long as bar 44 is permitted to be free to pivot in a vertical plane.

The normal operation of our device is as follows: When the tractor is at the end of a field and is about to commence the plowing operation or is about to make a return trip through the field, the plow unit is lowered to the ground level 76 by hydraulically powered arms 20 so that the plow unit is supported by the ground. The tension in springs 68 tends to pivot the forward end of bar 44 upwardly about bolt 52 but since the forward end of bar 44 is secured to the tractor, the bar pivots with respect to tongue 32 and bracket 34 to a position of disalignment therewith as shown by the solid lines of Fig. 1 and the dotted lines of Fig. 2. Springs 68 cause this disalignment by moving bar 44 so that bolts 50 and 52 are located in the forward ends of slots 46 and 48, respectively. Since the forward end of arcuate slot 46 is lower than the forward end of slot 48, the disalignment of bar 44 with respect to tongue 32 and bracket 34 is permitted to occur. As shown in Figs. 1 and 2, the "break" or disalignment of bar 44 and tongue 32 causes the forward end of the tongue to drop or move toward the ground level. This depression of the forward end of the tongue changes the angular position of the plow frame 10 and causes it to tilt forward on cross bar 16. This "tilting" action of frame 10 obviously causes plow members 12 and 14 to point into the ground at a sharper angle which in turn, facilitates their immediate entry into the ground as the tractor begins its forward movement. In practical operation, our device lowers the tongue approximately three inches or the equivalent of about ten turns of crank 30.

As the low members dig into the ground, the drag thereon proportionately increases. Soon the combined forces of the forwardly moving tractor and the drag on the plow members tend to raise the forward end of the tongue 32 upwardly. As this occurs, bar 44 becomes aligned with tongue 32 and bracket 34, and bar 44 pivots into this aligned position by moving on bolts 50 and 52 so that these bolts are located in the rearward ends of slots 46 and 48, respectively, as shown by the solid lines in Fig. 2. The raising of the forward end of tongue 32 by the alignment of bar 44 with the tongue levels plow members 12 and 14 so that they do not continue to bury themselves in the ground.

As soon as the tractor operator withdraws the plow from the ground to turn around and make a return trip through the field, the springs 68 cause a re-occurrence of the above-described disalignment which automatically places the plow members in an angular position for rapid entry into the ground. As before, the drag resulting from the plowing operation will cause re-alignment of the bar 44 with the tongue 32 which serves to level the plow members 12 and 14. Disc 66 can be selectively moved on yoke 60 with respect to post 42 to selectively adjust the tension in springs 68 if so desired.

Thus, from the foregoing, it is seen that our invention will accomplish at least all of its stated objectives.

Some changes may be made in the construction and arrangement of our drawbar attachment for plows without departing from the real spirit and purpose of our invention, and it is our intention to cover by our claims, any modified forms of structure or use of mechanical equivalents which may be reasonably included within their scope.

We claim:

1. In combination, a plow unit having a frame and at least one plow member, said plow member adapted to plow at a predetermined depth in the ground, a tongue member extending forwardly from said frame, a bar movably secured to said tongue, the forward end of said bar adapted to engage and to be secured to the drawbar of a tractor, and a means connecting said bar and said tongue member to normally yieldably hold the forward end of said tongue member at a lower level than the forward end of said bar when said plow member is being moved by a tractor at less than its predetermined depth; said bar being free from operative engagement with said plow member.

2. In combination, a plow unit having a frame and at least one plow member, said plow member adapted to plow at a predetermined depth in the ground, a tongue member extending forwardly from said frame, a bar movably secured to said tongue, the forward end of said bar adapted to engage and be secured to the drawbar of a tractor, and means on said tongue member and said bar to normally yieldably hold said tongue member and said bar in a disaligned position when said plow member is being moved by a tractor at less than its predetermined plowing depth; said bar being free from operative engagement with said plow member.

3. In combination, a plow unit having a frame and at least one plow member, a tongue member extending forwardly from said frame, a bar movably secured to said tongue and adapted to be secured to the drawbar of a tractor, an arcuate slot extending forwardly and downwardly in the forward end of said bar, a straight elongated slot in said bar extending rearwardly from a point adjacent the rear end of said arcuate slot, bolt members extending in a lateral direction from said tongue member through each of said respective slots; said bolts being closely spaced to permit movement of said bar on said bolts, and spring means connecting said tongue member and the forward end of said bar to yieldably hold the forward ends of each of said slots in engagement with said respective bolts.

4. In combination, a plow unit having a frame and at least one plow member, a tongue member extending forwardly from said frame, a bar movably secured to said tongue and adapted to be secured to the drawbar of a tractor, an arcuate slot extending forwardly and downwardly in the forward end of said bar, a straight elongated slot in said bar extending rearwardly from a point adjacent the rear end of said arcuate slot, bolt members extending in a lateral direction from said tongue member through each of said respective slots; said bolts being closely spaced to permit movement of said bar on said bolts, spring means connecting said tongue member and the forward end of said bar to yieldably hold the forward ends of each of said slots in engagement with said respective bolts, and means on said spring for selectively adjusting the tension therein.

5. In combination, a plow unit having a frame and at least one plow member, a tongue member extending forwardly from said frame, a bar movably secured to said tongue and adapted to be secured to the drawbar of a tractor, and means on said tongue member and said bar to yieldably hold said tongue member and said bar in a disaligned position; said means being sensitive to the combined forces of tractor drawbar pull on said bar and earth drag on said plow member so that a predetermined value of these forces will move said tongue member and said bar to a position of alignment.

6. In combination, a plow unit having a frame and at least one plow member, a tongue member extending forwardly from said frame, a bar movably secured to said tongue and adapted to be secured to the drawbar of a tractor, a means connecting said bar and said tongue member to yieldably hold the forward end of said tongue member at a lower level than the forward end of said bar; said means being sensitive to the combined forces of tractor drawbar pull on said bar and earth drag no said plow member so that a predetermined value of these forces will move said tongue member and said bar to a substantially level position.

References Cited in the file of this patent

UNITED STATES PATENTS

| | | |
|---|---|---|
| 1,831,997 | Brown | Nov. 17, 1931 |
| 1,940,061 | Paul | Dec. 19, 1933 |
| 2,359,600 | Altgelt | Oct. 3, 1944 |
| 2,844,083 | Du Shane | July 22, 1958 |